US006986656B2

(12) United States Patent
Moyes et al.

(10) Patent No.: US 6,986,656 B2
(45) Date of Patent: *Jan. 17, 2006

(54) METHOD OF AND SYSTEM FOR FORMING A FIRE DOOR CORE

(75) Inventors: Hartley Moyes, West Yorshire (GB); Michael Windsor Symons, Pretoria (ZA)

(73) Assignee: Premdor International, Inc., Bridgetown (BB)

( * ) Notice: Subject to any disclaimer, the term of this patent is extended or adjusted under 35 U.S.C. 154(b) by 0 days.

This patent is subject to a terminal disclaimer.

(21) Appl. No.: 10/882,294

(22) Filed: Jul. 2, 2004

(65) Prior Publication Data

US 2004/0241270 A1 Dec. 2, 2004

Related U.S. Application Data

(63) Continuation of application No. 09/973,086, filed on Oct. 10, 2001, now Pat. No. 6,773,639.

(30) Foreign Application Priority Data

Oct. 12, 2000 (GB) .................................. 0025037

(51) Int. Cl.
B28B 3/04 (2006.01)
B28B 3/02 (2006.01)
B28B 7/22 (2006.01)
B28B 7/24 (2006.01)
B28B 11/24 (2006.01)

(52) U.S. Cl. ................ 425/360; 425/405.1; 425/405.2; 425/430; 425/434; 366/13; 366/14; 366/15

(58) Field of Classification Search .................. 264/42, 264/71, 102, 338, 87, 333, 257, 112, 109, 264/122, 40.6; 428/313.7; 106/675; 425/360, 425/405.1, 405.2, 430, 434; 52/745.16; 29/897.3, 29/897.32; 366/3, 13, 14, 15
See application file for complete search history.

(56) References Cited

U.S. PATENT DOCUMENTS 3,253,881 A * 5/1966 Donahue ....................... 8/188
3,554,934 A * 1/1971 Ingram ......................... 521/54

(Continued)

OTHER PUBLICATIONS

Lewis, Sr., Richard J., Definition of "ethylene glycol monobutyl ether", Hawley's Condensed Chemical Dictionary, 1997, Thirteenth Edition, p. 469.*

*Primary Examiner*—Michael P. Colaianni

*Assistant Examiner*—Michael I. Poe

(74) *Attorney, Agent, or Firm*—Berenato, White & Stavish, LLC

(57) ABSTRACT

A method and system of forming a fire door core are provided. Hydraulic binder and resin are supplied from raw material bins and mixed to provide a submixture. Exfoliated vermiculite is then mixed with the submixture to provide a mixture that is deposited into a plurality of compression molds. Each of the filled molds are pressed in a press at a predetermined temperature at a predetermined pressure for a predetermined period of time sufficient to harden the mixture into a hardened slab. The hardened slabs are then removed from the molds, impregnated with water or steam in a water impregnation assembly and dried in a drying assembly.

12 Claims, 7 Drawing Sheets

U.S. PATENT DOCUMENTS

| | | | |
|---|---|---|---|
| 3,758,319 A * | 9/1973 | Ergene | 523/218 |
| 3,793,134 A * | 2/1974 | Hardy et al. | 428/34.5 |
| 4,127,628 A * | 11/1978 | Uchida et al. | 264/42 |
| 4,191,667 A * | 3/1980 | Wehrmann et al. | 521/49 |
| 4,447,380 A * | 5/1984 | Shannon et al. | 264/82 |
| 4,524,039 A * | 6/1985 | Bevan | 264/71 |
| 4,746,555 A * | 5/1988 | Luckanuck | 428/35.6 |
| 5,358,676 A * | 10/1994 | Jennings et al. | 264/71 |
| 5,723,226 A * | 3/1998 | Francis et al. | 428/688 |
| 6,554,893 B2 * | 4/2003 | Klus | 106/675 |
| 6,773,639 B2 * | 8/2004 | Moyes et al. | 264/40.6 |

* cited by examiner

METHOD OF AND SYSTEM FOR FORMING A FIRE DOOR CORE

CROSS-REFERENCE TO RELATED APPLICATION AND CLAIM TO PRIORITY

This application is a continuation of application Ser. No. 09/973,086, filed Oct. 10, 2001, now U.S. Pat. No. 6,773,639. the disclosure of which is incorporated herein by reference and to which priority is claimed under 35 U.S.C. § 120.

FIELD OF THE INVENTION

The invention is related to methods and systems of forming a core for a fire door. More particularly, the invention is related to methods and systems for forming a fire door core containing resin and vermiculite.

BACKGROUND

The use of fire doors in buildings is an important factor in avoiding injuries and loss of lives and in preventing property damage as a result of the door's ability to impede the spread of fire. In the interest of public safety, standards have been set by governmental agencies, building code authorities and insurance companies for the installation and performance of door assemblies which retard the passage or spread of fire. Building codes require that fire-resistant door assemblies pass standard industry-wide tests that are an evaluation of the fire-resistant properties of the door assembly in relation to heat and flame for a specified duration.

The manufacturing of cores for fire doors has always presented one or more of several different problems. Some manufacturing methods and systems yield cores for fire doors that do not meet particular building codes or fire regulation specifications, or at least do not meet all of a variety of such regulations in the various jurisdictions in which they might be sold or used. Some methods and systems may be too time-consuming, have a higher than satisfactory failure rate, or are simply too expensive. As a result, fire doors may not be used as often as desirable.

Satisfactory fire door core manufacturing practices should produce a core having certain basic properties meeting standard industry-wide fire endurance tests, such as those in accordance with UL 10C (1998), NFPA 252 (1995), and UBC 7-2 (1997). In these tests, a doorframe and door (including the manufactured core) are exposed to intense heat such as that generated by fire in a burning building. Exemplary conditions of such tests involve exposing the door assembly to temperatures which progressively increase within the range of 2000° F. for an exposure period up to 1½ hours or more. However, some manufacturing methods and systems produce fire doors that suffer from spalling during such a fire test. The spalling incurred may reduce the original thickness of the fire door by as much as 30–40%.

Satisfactory manufacturing practices should also produce a core having good integrity during exposure to fire. The core must resist burning, melting, spalling, cracking, bursting or deteriorating in a way which would cause the temperature, on the side of the door not exposed to the fire, to rise to the extent that the combustible veneer on the unexposed side of the door burns or chars substantially. During exposure to heat, the core must also exhibit good dimensional stability. The core must remain relatively stable and resist warping or shrinking to the extent that it remains in contact with the banding (stiles and rails) around its perimeter. Separation from the banding can cause the combustible components to burn away prematurely, allowing fire to penetrate the opening. Additionally, the core must be resistant to heat transmission, such that the transfer of heat from the fire-exposed side of the door to the unexposed side is deterred. Otherwise, ignition and possible spread of fire may result from premature charring or burning of the combustible veneer of the unexposed side on the door.

Other than these fire and heat-resistant properties, core-manufacturing practices should produce cores having properties related to the manufacture, installation and service of fire doors. For example, the door core must have sufficient strength, yet be light enough in weight, to allow a fire door employing the core to be hung and used without becoming unattached from its mounting.

Fire door core manufacturing methods and systems should also have a relatively low manufacturing rejection rate, a relatively high production rate, and allow a core to be produced with a relatively low cost.

Those skilled in the art will recognize that there is a need for a method and system for producing a fire door core that is effective to retard the penetration and spread of fire or the transmission of heat. Further needs in the art are a method and system for producing a fire door which does not incur an unsatisfactory level of spalling during exposure to fire and/or later exposure to the flow of a water from a fire hose. Still further needs in the art are a method and a system for producing a relatively strong and durable fire door core that is sufficiently light to avoid the trouble and expense of special door frame structures on which to hang a fire door made from it. Still further needs in the art are a fire door core forming method and a fire door core forming system that have a low failure rate, a low overall cost, and a high production rate.

SUMMARY OF THE INVENTION

It is therefore a primary object of the invention to provide a method and system for forming a fire door core that meet these needs in the art. More particularly, it is an object to provide a method and system for forming fire door cores that are well suited for entry doors. Additionally, it is an object to provide a method and system for forming fire door cores and fire door support structures wherein the fire door cores have a density lower than that of the fire door support structures.

The inventor has discovered that these needs may be met by a method of forming a fire door core, comprising the following steps. A mixture of exfoliated vermiculite, resin, and hydraulic binder is deposited into a mold. The mold, and thereby the mixture, is transferred to a heated press. A predetermined pressure at a predetermined temperature for a predetermined period is applied to the mixture through the press in order to cause the mixture to harden into a slab. The hardened slab is removed from the mold. The slab is impregnated with water. The impregnated slab is dried to a predetermined moisture content. The slab may thereafter be formed into a core for use in a fire door. Hardened slabs of different densities may be produced by the inventive process. Thus, a hardened slab having a lower density may be used for the core of the fire door, and a hardened slab having a density higher than that of the core may be formed into support structures, such as stiles and rails. The hardened slab used for the support structures is preferably not impregnated with water. The support structures may be utilized with the fire door core in forming the fire door.

A door core forming system, according to another aspect of the invention, comprises a plurality of raw material sources, a mixing system, a plurality of molds, a vibratory assembly, a heated press, a water impregnation assembly, and a drying assembly. The mixing system is in communication with the raw material sources. Each mold is in operative communication with the mixing system for receiving a predetermined supply of mixed raw materials. The vibratory assembly is for receiving each of the molds and causing the mixed raw materials to achieve a substantially uniform density in each mold. The press is operatively associated with the vibratory assembly and is for receiving the filled molds and applying sufficient heat and pressure for a sufficient period to cause the mixed raw materials to achieve a slab having a hardened state. The water impregnation assembly is operatively associated with the press and is for impregnating the hardened slabs with water or steam. The drying assembly is operatively associated with the water impregnation assembly and is for drying the slabs to a predetermined moisture content. Different densities of hardened slabs may be simultaneously produced by the inventive system by utilizing a plurality of presses, each of which is adapted to produce a hardened slab of a particular density. Thus, a hardened slab having a lower density for use as a fire door core may be simultaneously formed along with hardened slabs having a higher density for use as fire door support structures, such as stiles and/or rails.

DETAILED DESCRIPTION

Figure 1:
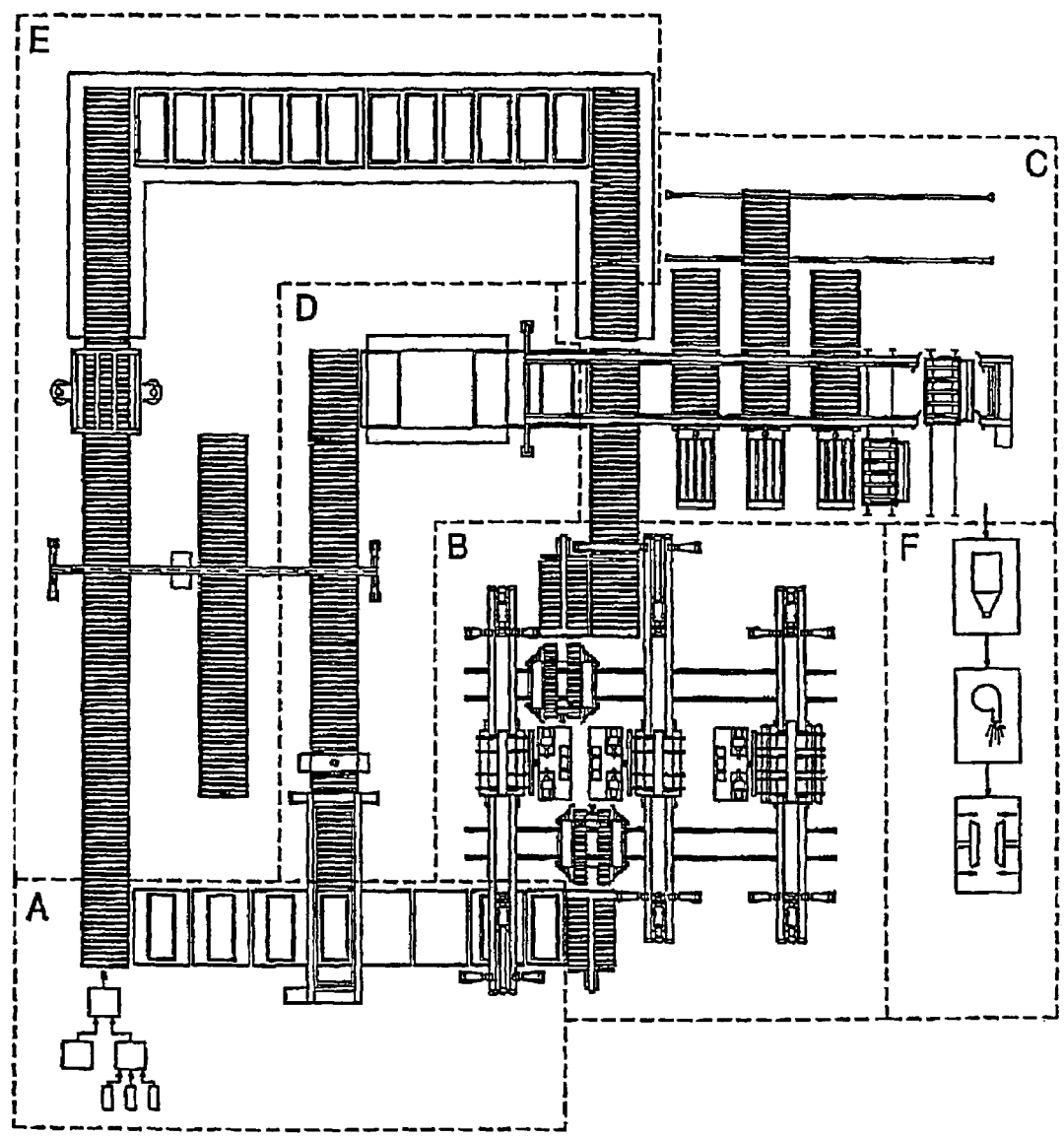
FIG. 1 is a schematic drawing of the inventive system.

The inventor has found that by employing the method and system according to the invention, a fire door core having improved fire resistance properties may be obtained. The fire door core produced by the inventive method and system consists of resin-bonded exfoliated vermiculite and hydraulic binder (hereinafter RBEV composite). While being exposed to fire temperatures, a fire door made with such a core resists burning, melting, spalling, cracking, delamination, splitting, deteriorating, dimensional deformation and bowing at fire temperatures, while at the same time retaining its integrity when exposed to a hose stream. The fire door made with such a core has a resistance to spalling such that approximately 100% of the fire door's original thickness is retained after exposure to fire and later exposure to the flow of water from a fire hose. These improved properties are at least partly the product of employing a RBEV composite for the core.

This inventive method includes pressing and heating molds filled with a mixture of resin, exfoliated vermiculite and hydraulic binder, followed by removing hardened slabs of RBEV composite from the molds, impregnating the slabs with water in order to hydrate the binder, and drying the impregnated slabs to a predetermined moisture content.

A wide range of slab densities is possible with the inventive method and system. When used as a fire door core, a lower density (350–600 kg/m$^3$) slab exhibits satisfactory fire and heat-resistant properties while being less costly to manufacture. A higher density (900–1,300 kg/m$^3$) slab may be employed as material for forming into support structures for fire doors, such as rails and/or stiles. The higher density slab also exhibits satisfactory fire and heat-resistant properties and displays an enhanced ability to hold threaded fasteners inserted into it. Hardened slabs having a lower density are impregnated with water. Because the higher density hardened slabs are primarily used for support structures and not for the core, they need not be impregnated with water. In order to enhance various mechanical properties of the support structure, higher density hardened slabs are also preferably formed from RBEV composite containing a fibrous reinforcement.

The inventive system includes a plurality of raw material bins, first and second mixing assemblies, a plurality of molds, a vibratory assembly, a heated press, a water impregnation assembly and a drying assembly. This system allows hardened slabs of RBEV composite to be continuously produced in a relatively short period of time with a relatively low overall cost. The inventive system also provides for reuse of many system components, as well as simultaneous production of hardened slabs having different densities.

Regarding the core made of RBEV composite, the core contains chemically bound water. The chemically bound water is present as water of hydration of the hydraulic binder, i.e., water molecules combined in a definite ratio as an integral part of a crystal of a solid compound of the hydraulic binder. Levels of this chemically bound water contained in the core remain stable at ambient temperatures. On the other hand, the level of any physically bound water contained in the core will vary according to the humidity level of the surrounding air space.

As heat is applied to the core, such as in a fire test, the chemically bound water provides an insulative cooling effect to the core. It is known that great quantities of thermal energy transmitted by the exposed face of the core to the rest of the core are consumed by the chemically bound water as it is transformed from the crystalline hydrated state to a gaseous state. For example, when gypsum is selected as the hydraulic binder, the chemically bound water will start to be released during a fire test when the temperature of the unexposed face of the core reaches approximately 70° C. Instead of raising the temperature of the unexposed face of the core, the additional thermal energy from continued application of heat is consumed by the transformation of the chemically bound water. This continued consumption of thermal energy serves to delay the eventual rise in the unexposed core face temperature that occurs when much of the chemically bound water has already been released. Because this temperature rise is delayed, overheating and possible combustion of combustible door components is deterred.

The insulative cooling effect of the chemically bound water is complemented by the presence of exfoliated vermiculite in the core. Exfoliated vermiculite is an excellent fire resistant material, and serves to deter the spread of fire. Moreover, as further heat is applied to the core after release of the chemically bound water, the exfoliated vermiculite at the surface of the core will vitrify and form a thin, hard shell on the exposed surfaces of the core, thus presenting an additional fire resistant barrier.

As discussed above, the hydraulic binder in the RBEV composite contains chemically bound water as water of hydration. When gypsum is selected as the hydraulic binder, calcium sulfate and water are chemically bound within the crystalline hydrate structure, i.e., $CaSO_4 \cdot \frac{1}{2}H_2O$ and/or $CaSO_4 \cdot 2H_2O$. The resin in the RBEV composite binds the exfoliated vermiculite and hydraulic binder and enhances the strength of the RBEV composite. Hence, a hardened slab of RBEV composite may be used as a freestanding structure.

A resin that is a powder and is solid at room temperature may be used for the resin. As the solid resin in the RBEV mixture-filled molds is heated during the pressing step, such as to a temperature of about 125–130° C., the resin begins to flow at a viscous rate. As the resin flows between solid particles of the vermiculite, binder, and fibrous reinforcement contained in the RBEV composite, it adheres to a greater percentage of the surface area of the solid particles. As the resin continues to be heated during the pressing step, such as up to a temperature of about 140–145° C., its viscosity decreases and its flow between, and adherence to, solid particles in the RBEV composite is enhanced. The resin has a reaction temperature at which it begins to cure or harden with the aid of a catalyst. As the resin and catalyst reach the reaction temperature, such as a temperature of about 140–145° C., a curing agent is released and cures the resin to harden the resin into a solid state. Once the resin is cured, the RBEV ingredients form a hardened three-dimensional matrix of resin, exfoliated vermiculite and hydraulic binder. Because the resin undergoes this reaction in the mold filled with the RBEV mixture, a hardened slab of RBEV composite is produced.

The heated pressing step also develops the ability of a higher density hardened slab to strongly hold a threaded fastener inserted into it. As the pressing is increased and/or held, a plurality of parallel layers of exfoliated vermiculite and fibrous reinforcement are formed, resembling layers of cellulose or "grain". When these layers are oriented parallel to an outward-facing edge of the higher density hardened slab, threaded fasteners inserted into the slab will be held by a great number of such layers. This orientation of parallel layers is at least partly responsible for the higher density hardened slab's ability to hold threaded fasteners with up to three times the force than compared to slabs without layers oriented in such a manner.

Water impregnation of the lower density hardened slabs helps to fully activate the cooling effect provided by the chemically bound water. Since it is advantageous to have a relatively low level of chemically bound water in the RBEV mixture during the pressing step, the hydraulic binder should be hydrated after pressing. Preferably, lower density hardened slabs are impregnated with water such that the hydraulic binder is fully hydrated. For example, if gypsum is selected as the hydraulic binder, the lower density hardened slab should be impregnated to such an extent that any non-hydrated gypsum ($CaSO_4$), and any partially hydrated gypsum ($CaSO_4 \cdot \frac{1}{2}H_2O$), is converted to hydrated gypsum ($CaSO_4 \cdot 2H_2O$). On the other hand, the higher density hardened slabs are preferably not impregnated with water. Since the higher density hardened slabs serve to provide material for forming support structures and not fire resistant cores, impregnation is not necessary because the high density hardened slabs only present a very small portion of the surface area of a fire door exposed to a fire.

After water impregnation of the low density hardened RBEV slabs, they are dried. This lowers the overall weight of the slab, enables easy installation, and provides a durable mounting and a finished product. A sufficient amount of chemically bound water remains in the slab such that the insulative cooling property is satisfactorily improved.

In addition to exfoliated vermiculite and hydraulic binder, the RBEV composite advantageously contains a resin catalyst and an internal release agent. The resin catalyst accelerates the hardening reaction of resin contained within the RBEV composite. The internal release agent assists removal of a hardened slab of RBEV composite from a mold used in producing the slab. Preferably, the resin catalyst and internal release agent are pre-mixed with the resin. Additionally, in order to further enhance release of the hardened slab, a surface release agent may be applied to the molds, or the molds may have hard chrome plating or hardened polished steel surfaces.

Higher density hardened slabs also advantageously contain a fibrous reinforcement. The fibrous reinforcement enhances the tensile strength, rigidity and structural integrity of support structures formed from a high density hardened slab, as well as the support structure's ability to strongly hold a threaded fastener.

As best illustrated in FIG. 1, the system includes a mixing, depositing, shaking and covering station A, two lower density pressing stations and one higher density pressing station B, a slab and mold separation station C, a top moving plate cooling, cleaning and return line D, a female die and bottom moving plate cooling, cleaning and return line E, and a water impregnating, drying and trimming station F.

Figure 2:
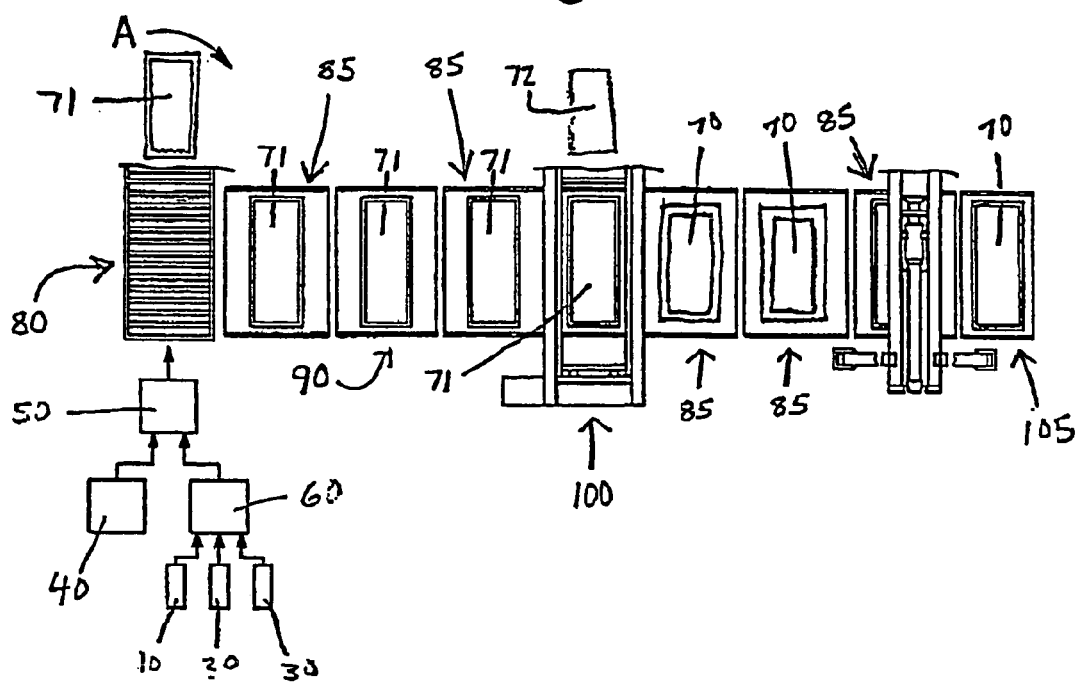
FIG. 2 is a schematic drawing of a mixing, depositing, shaking and covering station in the inventive system.

As best illustrated in FIG. 2, hydraulic binder, resin (including resin catalyst and internal release agent), fibrous reinforcement (if selected), and exfoliated vermiculite are contained in first, second, third, and fourth raw material bins 10, 20, 30, and 40, respectively. As discussed above, the fibrous reinforcement is preferably for use in high density hardened slabs, and need not be present in low density hardened slabs. Hence, the addition of fibrous reinforcement depends on which type of hardened slab is being produced. Predetermined amounts of hydraulic binder, which is preferably synthetic gypsum, resin, which is preferably a novolac resin, and fibrous reinforcement, which is preferably chopped strand glass fiber, are supplied from the first, second, and third raw material bins into a second mixing assembly 60. Mixing assembly 60 is a paddle mixer ribbon blender, or air blender and the raw materials are mixed for not more than approximately two minutes to provide a submixture. Both exfoliated vermiculite from a fourth raw material bin 40 and the submixture from the second mixing assembly 60 are supplied to a first mixing assembly 50. Mixing assembly 50 is a paddle mixer or ribbon blender, or air blender and the raw materials are gently mixed, preferably for no more than two minutes to provide a RBEV mixture. Care should be taken to gently mix the RBEV mixture in order to avoid delamination and/or breaking of the exfoliated vermiculite.

A plurality of compression molds 70 are used to mold hardened slabs of RBEV composite from RBEV mixture. Each compression mold 70 has a female die and a bottom moving plate (hereinafter female die and bottom moving plate 71) and a top moving plate 72 that cooperate to define a cavity. The cavity defined in the mold depends upon which density is desired for the hardened slab. For lower density hardened slabs, the cavity is substantially 2050 mm long, 870 mm wide, and 41 mm deep. For higher density hardened slabs, the cavity is substantially 1200 mm wide and 41 mm deep and either 2500 mm or 2200 mm long. One of ordinary skill in the art will appreciate that any one or more of the cavity's dimensions may be adjusted to produce the desired size of the hardened slab thus produced. The female die and bottom moving plate 71 and top moving plate 72 are configured to provide a rectangular shape to the slab, but other configurations are available. The inward-facing surfaces of the female die and bottom moving plate 71 and top moving plate 72 may have hard chrome plating or hard polished steel surfaces and/or be coated with a surface release agent in order to assist later removal of the hardened slabs that are eventually formed between the female die and bottom moving plate 71 and top moving plate 72. The female die and bottom moving plate 71 and top moving plate 72 are desirably pre-heated, but not to a temperature higher than the reaction temperature of the resin. If the mold temperature is higher than the reaction temperature of the resin, the resin will start to prematurely cure before the final shape of the slab of RBEV composite is formed. Preferably, the molds are pre-heated to a temperature not higher than about 125° C.

As shown in FIG. 2, female die and bottom moving plates 71 are transferred lengthwise by transfer tables 85 from a return line (originating later in the process and system) to fixed stop at a loading assembly 80. The transfer tables have rollers driven by an inverter in order to propel the female die and bottom moving plates 71 along. The return line is discussed in greater detail below.

At the loading assembly 80, the RBEV mixture prepared within the first mixing assembly 50 is deposited into the female die and bottom moving plates 71. In case a top moving plate 72 is inadvertently covering a female die and bottom moving plate 71 at the loading assembly 80, the loading assembly 80 has mechanical and electrical sensors for detecting whether the female die and bottom moving plate 71 in position for deposition of RBEV mixture is already covered by a top moving plate 72. If such a condition is detected, operators may stop the system in order to remove the top moving plate 72. Mechanical and electrical sensors at the loading assembly 80 also detect when a female die and bottom moving plate 71 in position for deposition of RBEV mixture has been filled. Deposition is continued until a filled condition is sensed or detected.

One skilled in the art will recognize that deposition into a female die and bottom moving plate 71 of a viscous semi-solid mixture, such as the RBEV mixture, may result in a non-uniform density, crowning and/or an uneven thickness of RBEV mixture and/or air bubbles in female die and bottom moving plate 71. In order to alleviate such non-uniform density, crowning, uneven thickness, and/or air bubble problems, the filled female die and bottom moving plates 71 are laterally transferred by a transfer table 85 to a vibratory assembly 90. At the vibratory assembly 90, the filled female die and bottom moving plates 71 are vibrated so that the RBEV mixture contained within will achieve a substantially uniform density. Once vibrated, the RBEV mixture will have acquired a more uniform thickness.

As illustrated in FIG. 2, the vibrated female die and bottom moving plates 71 are then laterally transferred by a transfer table 85 to a fixed stop at a top moving plate lay down assembly 100. At the assembly 100, the top moving plates 72 are placed over each of the vibrated female die and bottom moving plates 71 to provide vibrated, filled compression molds 70.

Figure 3:
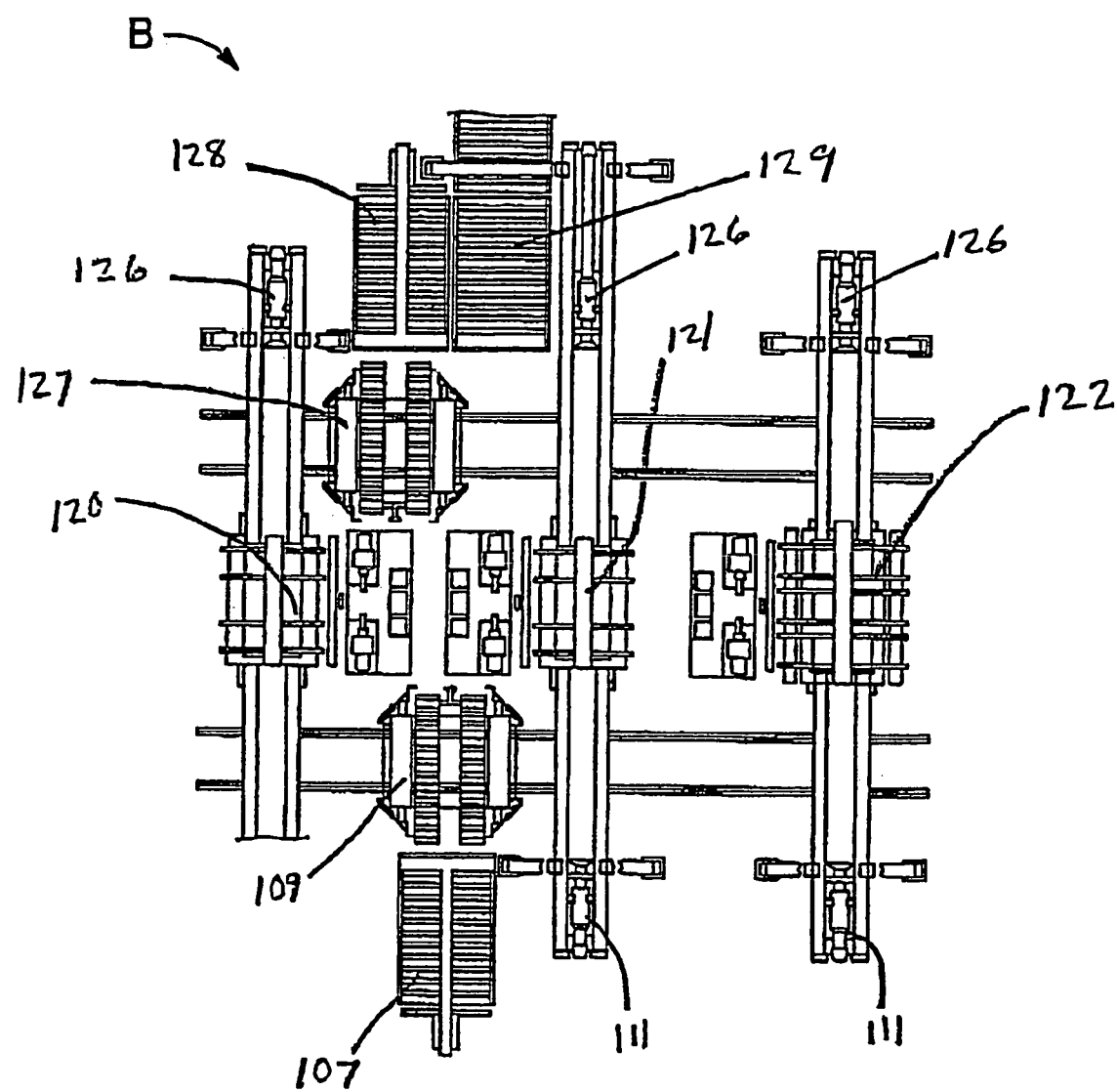
FIG. 3 is a schematic drawing of two lower density pressing stations and one higher density pressing station in the inventive system.

The vibrated, filled molds 70 are then laterally transferred by three transfer tables 85 to an adjustable transfer table 105. The adjustable transfer table 105 has a scissors jack and motorized rollers allowing the table 105 to raise, lower, and laterally transfer the covered molds 70 onto an adjustable loading station and mold pusher 107, as best illustrated in FIG. 3. The adjustable loading station and mold pusher 107 also has a scissors jack, with a lift capacity of 5,000 N, for raising and lowering the molds 70, as well as a push bar, with a pushing thrust of 1,500 N, attached to the scissors jack for pushing the molds 70 into a multi-mold loading device 109. As the molds 70 are loaded onto the loading station and pusher 107, they are stopped, centered and lifted to the height of the multi-mold loading device 109. The multi-mold loading device 109 may hold up to eight molds 70 in separate compartments disposed atop one another. Those skilled in the art will appreciate that a multi-mold loading device 109 holding more or less than eight molds may instead be utilized. The push bar on the loading station and pusher 107 then pushes each mold 70 into one of the compartments in the multi-mold loading device 109. The adjustable transfer table 105 and adjustable loading station and mold pusher 107 repeat this transfer and loading process until the multi-mold loading device 109 is loaded with the number of molds 70 desired for pressing at one time.

As best illustrated in FIG. 3, the multi-mold loading device 109 then moves laterally to a position adjacent one of three multi-mold heated presses 120, 121, 122. The molds are pushed from the multi-mold loading device 109 by a vertical loading pusher 111 into the selected press 120, 121, 122. The use of three presses 120, 121, 122 allows the system to contemporaneously press a plurality of molds 70 to provide a plurality of hardened slabs with different densities. Presses 120, 121 are designed for lower density (350–600 kg/m$^3$) hardened slabs, while the press 122 is designed for higher density (900–1,300 kg/m$^3$) hardened slabs. Those skilled in the art will appreciate that any combination of the presses 120, 121, 122 may be designed for either or both of lower density and higher density hardened slabs.

Each mold 70 is then heated and pressed at a press 120, 121, 122 in order to cause the RBEV mixture to harden or cure into a slab.

The pressure applied to the molds 70 achieved by the press 120, 121, 122 is preferably adjusted for the desired density of the hardened slab being produced, i.e., a higher pressure is utilized for a denser hardened slab. For lower density hardened slabs (350–600 kg/m$^3$), the press 120 may be operated at a pressure of about 150–400 p.s.i. For a higher density hardened slab (900–1,300 kg/m$^3$), the press 120 may be operated at a pressure of about 800–1,200 p.s.i. Those skilled in the art will further appreciate that other hardened slab densities may be produced by the inventive methods and systems, and that other presses may also be used. The total pressing time for each covered mold 70 is advantageously set at about. 12–20 minutes for the chosen thickness. This time will vary for other thicknesses.

Each of the presses (used for forming lower density hardened slabs) 120, 121 shown in FIG. 3 has one upper platen and one lower platen that sandwich seven intermediate platens. The spaces between each pair of platens define eight compartments, each of which may hold a mold 70. This allows each press 120, 121 to simultaneously press up to eight molds 70 simultaneously. The interiors of the upper and lower platens and the press 120, 121 are filled with circulating oil whose temperature is controlled by a temperature controller. The interiors of each of the intermediate platens are also filled with circulating oil, but each platen has a separate temperature controller associated with it in order to more precisely control the temperature inside each mold 70. The temperature of each press 120, 121 and of all the platens is maintained at a temperature high enough to allow the resin in the mold 70 to flow and to harden, but not so high that the RBEV mixture begins to delaminate (the RBEV mixture may begin to delaminate at about 220° C.). Preferably, the heated press 120 temperature is maintained at about 190–220° C. Each of the presses 120, 121 also has two thrust cylinders that have a downstroking speed of 100 mm/sec., an upstroking speed of 97 mm/sec., and which reach their set pressing pressure in 6 sec. With these two thrust cylinders, the presses 120, 121 may achieve a maximum pressing pressure of 240 p.s.i., with a total thrust of 312 metric tons. A suitable press may be obtained from Italpresse. Those skilled in the art will appreciate that the presses 120, 121 may be adapted to hold more or less than eight molds. They will further appreciate that the presses 120, 121 may also be adapted to have a different downstroking speed, upstroking speed, maximum pressing pressure, or total thrust.

The press (used for forming higher density hardened slabs) 122 shown in FIG. 3 has one upper platen and one lower platen that sandwich one intermediate platen. The spaces between each pair of platens define two compartments, each of which may hold a mold 70. This allows the press 122 to simultaneously press up to two molds 70 at a time. Similar to the presses 120, 121, the interiors of the upper and lower platens and press 122 are filled with circulating oil, whose temperature is controlled by a temperature controller. The interior of the intermediate platen is also filled with circulating oil, but the intermediate platen has a separate temperature controller associated with it in order to more precisely control the temperature inside each mold 70. The temperature of the press 122 and of all the platens is maintained at the same temperature as those of the presses 120, 121. The press 122 has six thrust cylinders that have a downstroking speed of 100 mm/sec., an upstroking speed of 106 mm/sec., and which reach their set pressing pressure in 14 sec. With these six thrust cylinders, the press 122 may achieve a maximum pressing pressure of 995 p.s.i., with a total thrust of 2,100 metric tons. A suitable press may be obtained from Italpresse. Those skilled in the art will appreciate that the press 122 may be adapted to hold more or less than two molds. They will further appreciate that the press 122 may also be adapted to have a different downstroking speed, upstroking speed, maximum pressing pressure, or total thrust.

The pressure produced by each of the presses 120, 121, 122 upon the covered molds 70 should be increased slowly and smoothly in order to develop the "grain" of the RBEV solids discussed above. As the contents of the molds are heated, volatile components may be produced and generate a vapor pressure within the molds 70. Due to Charles Law of thermodynamics, as the molds 70 are compressed, the temperature of the volatile components that may be present within the molds 70 will rise, possibly leading to an undesirable exothermic reaction of the contents within the molds 70. Thus, the contents of the molds 70 should be periodically degassed during pressing. The degassing may be achieved by periodically lowering the pressing pressure applied to the molds 70 to below the generated vapor pressure of the volatile components. The generated gas is released, allowing a homogeneous structure to be created in the hardened slab.

As best illustrated in FIG. 3, the heated, pressed molds 70 are then unloaded (pulled) from the press 120, 121, 122 by vertical unloading extractors 126 and placed onto a multi-mold unloading device 127. The multi-mold unloading device 127 may hold up to eight molds 70 in separate compartments disposed atop one another. Molds 70 are then pulled one at a time from the multi-mold unloading device 127 by an adjustable unloading station and mold extractor 128. The unloading station and extractor 128 has a scissors jack, with a lift capacity of 5,000 N, for raising and lowering the molds 70, as well as a pull bar, with a pulling thrust of 1,500 N, attached to the scissors jack for pulling the molds 70 from the multi-mold unloading device 127. The unloading station and extractor 128 then sequentially lowers each mold 70 to the height of an adjustable transfer table 129. After lowering and transferring a mold 70, the unloading station and extractor 128 then raises itself again to the level of the multi-mold unloading device 127, for removing another mold 70 from the multi-mold unloading device 127. The adjustable transfer table 129 also has a scissors jack and motorized rollers allowing the table 129 to raise, lower, and laterally transfer the covered molds 70 to a transfer table 85. This unloading process described above is then continued until each of the molds 70 has been unloaded from the multi-mold unloading device 127. Those skilled in the art will appreciate that the multi-mold unloading device 127 may be adapted to hold more or less than eight molds.

Figure 4:
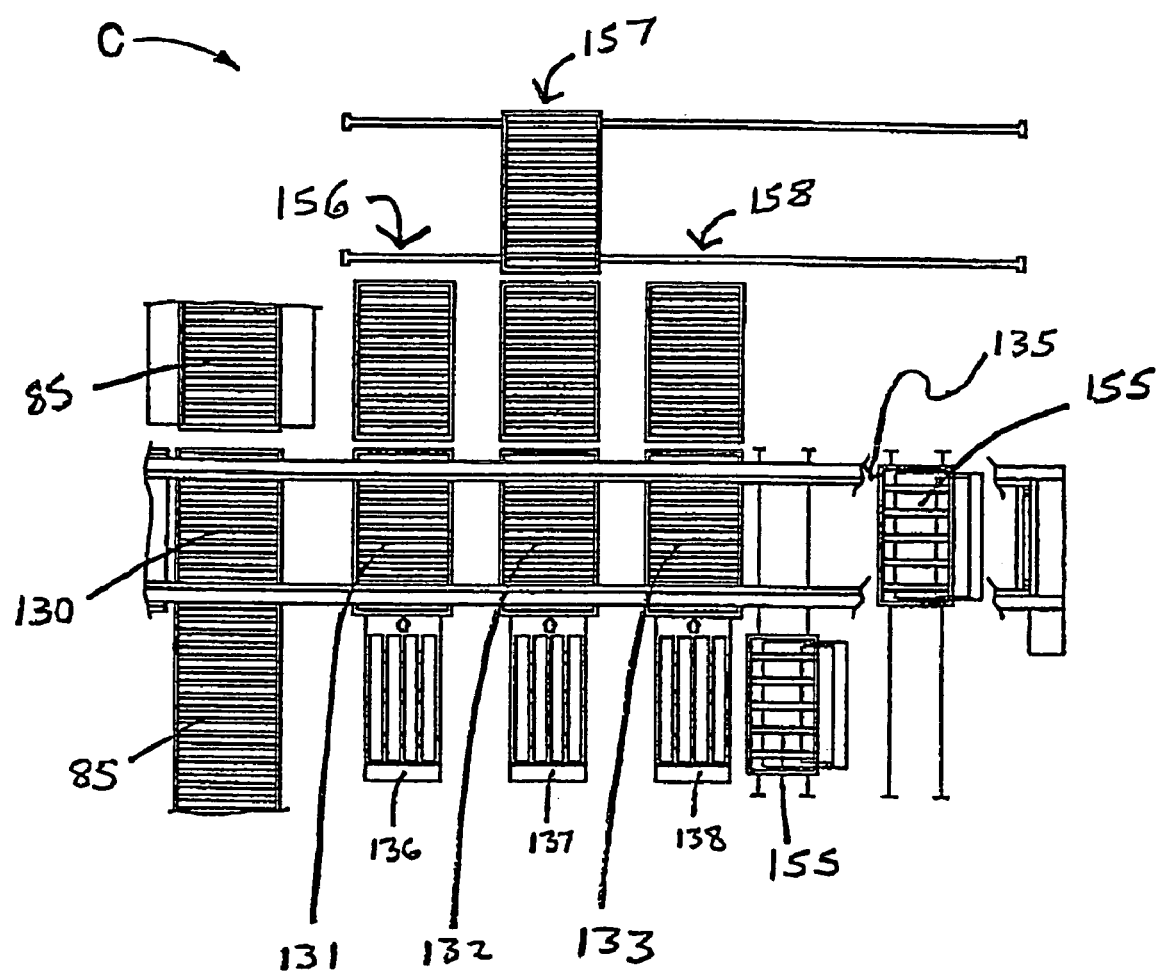
FIG. 4 is a schematic drawing of a slab and mold separation station in the inventive system.

Each mold 70 is then transferred lengthwise by the transfer table 85 to a holding station 130, as best shown in FIG. 4. The holding station 130 has a clamp to fix the position of the mold 70, and a plurality of pins that thrust upward to lift the top moving plate 72 up off the female die and bottom moving plate 71.

Figure 5:
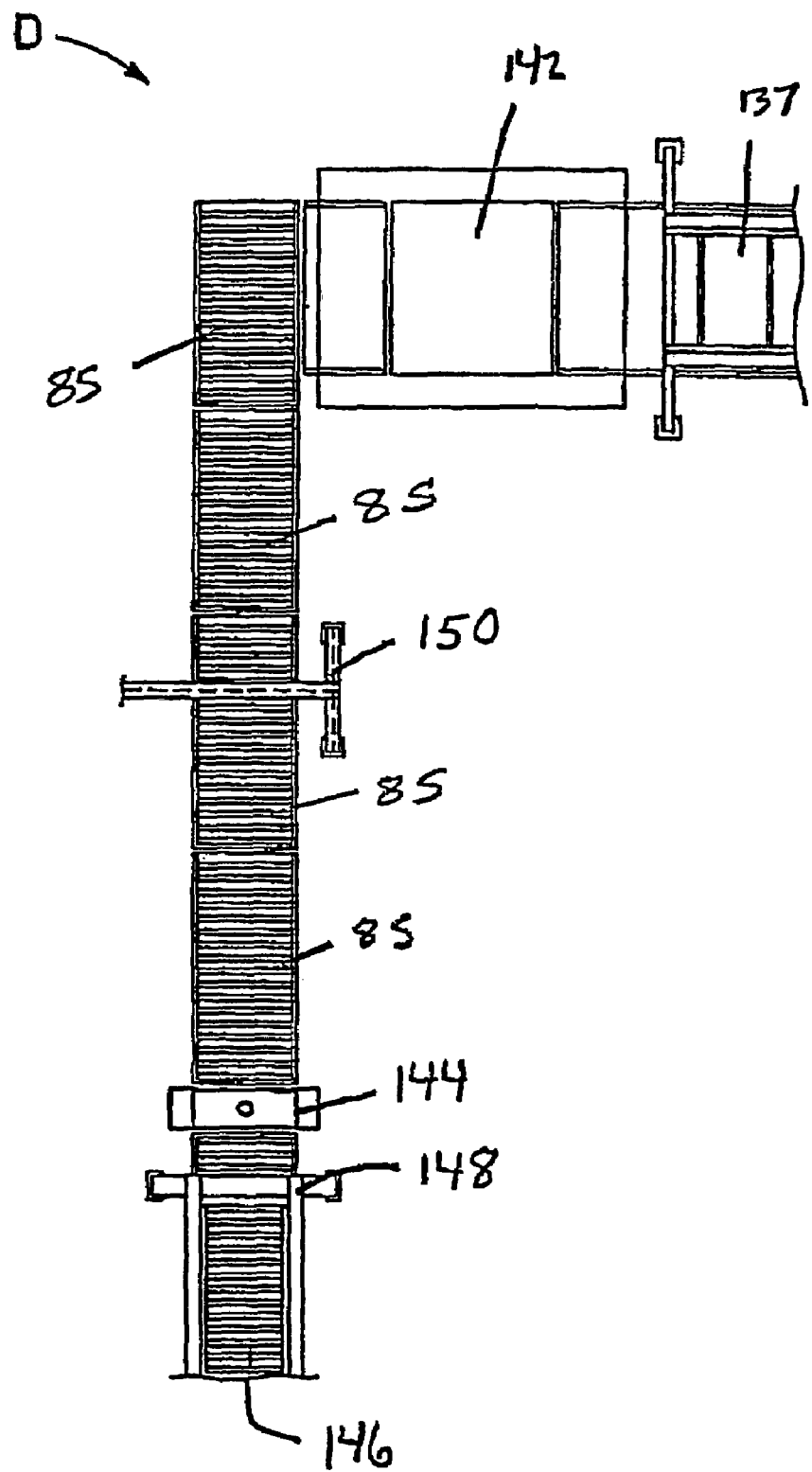
FIG. 5 is a schematic drawing of a top moving plate cooling, cleaning and return line in the inventive system.
Figure 6:
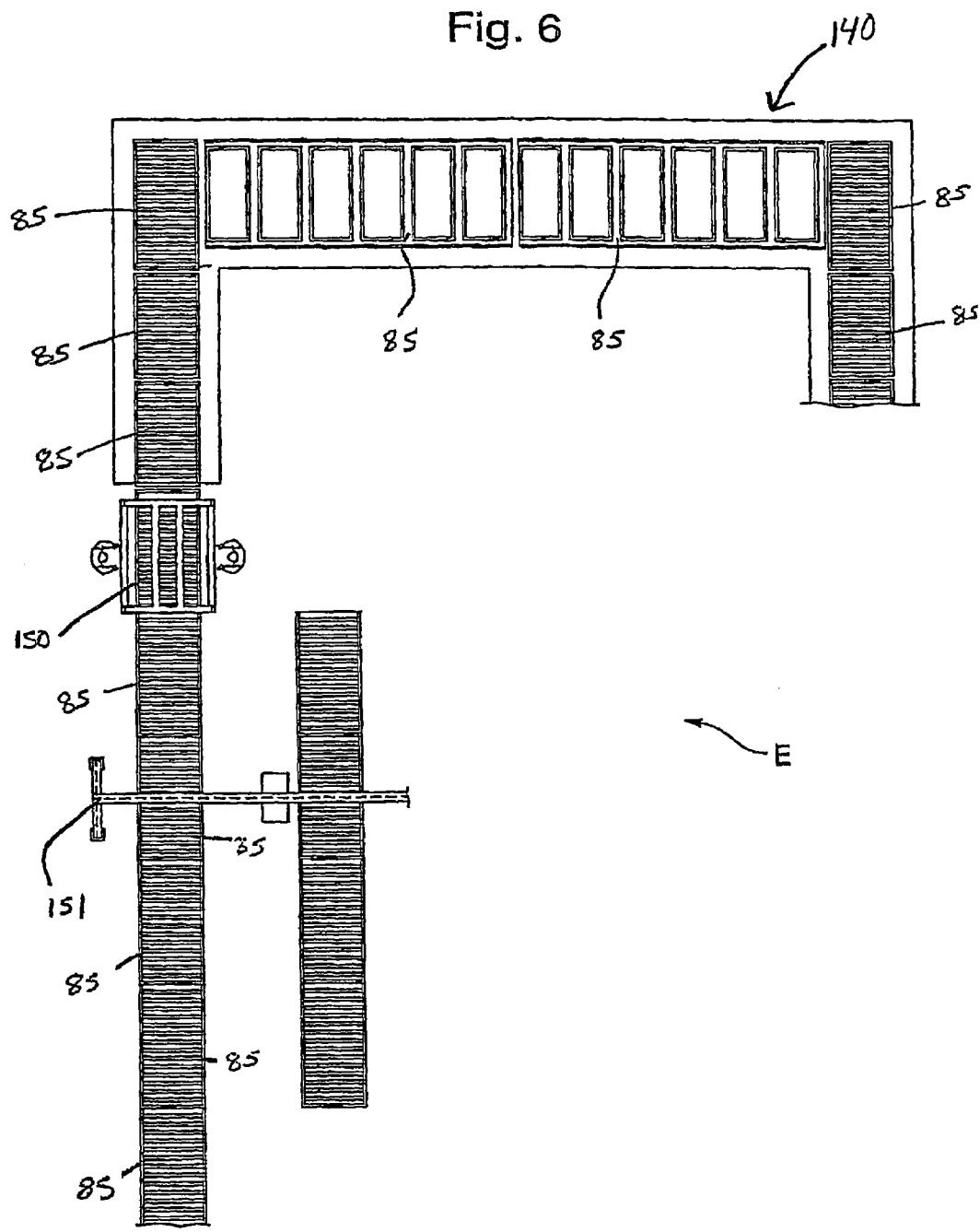
FIG. 6 is a schematic drawing of a female die and bottom moving plate cooling, cleaning and return line in the inventive system

The top moving plates 72, female die and bottom moving plates 71, and hardened slabs are then separated from one another by a vacuum unloading unit 135 that travels laterally along a runway. The vacuum unloading unit utilizes vacuum suction cups or an electromagnet to pull up and hold the top moving plate 72 with a pulling force of 500 N. The vacuum unloading unit then places the top moving plate 72 onto a top moving plate loading table 137, as best illustrated in FIG. 5. Referring back to FIG. 4, the vacuum unloading unit 135 next removes the hardened slab from the female die and bottom moving plate 71, again with a pulling force of 500N. The vacuum unloading unit 135 then places low density hardened slabs onto either of stacking stations 131 or 132, and high density hardened slabs onto stacking station 133. The emptied female die and bottom moving plate 72 is then transferred by motorized rollers on the holding station 135 and transfer tables 85 to a female die and bottom moving plate cooling room 140, as best shown in FIG. 6.

The system according to the invention is designed to allow re-use of the top moving plates 72. As best shown in FIG. 5, the top moving plates 72 are laterally transferred by the top moving plate loading table 137 into a top moving plate cooling room 142 where they are turned 90 degrees onto their sides and cooled to 125° C. by circulating air. The air in the top moving plate cooling room 142 has a flow of 20,000 m³/hr, an inlet temperature of 25° C. and an outlet temperature of 45° C., for a total dissipated energy of 150 kW/hr. The outlet air from the top moving plate cooling room 142 may optionally be vented to an apparatus for recovery of the dissipated heat energy from the cooling top moving plates 72 by passing the outlet air through a heat pump. Alternatively, the heat pump may be incorporated into the top moving plate cooling room 142. The rates of the top moving plates 72 and female die and bottom moving plates 71 through the cooling rooms 142, 140 correspond to one another such that the same top moving plate 72 removed from a particular female die and bottom moving plate 71 at the holding station 130 will be later placed upon the same female die and bottom moving plate 71 at the top moving plate lay down assembly 100.

Still referring to FIG. 5, after cooling, the top moving plates 72 exit the male die cooling room 142 and are transferred by transfer tables 85 toward the top moving plate lay down assembly 100. If any of the top moving plates 72 needs to be removed from the line, they may be removed by an operator from the transfer tables 85 by using a gantry frame 150. Otherwise, the top moving plates 72 are brushed clean at a brushing station 144, and stopped and positioned at centering table 146. At centering table 146, the top moving plates 72 are picked up by centering unit 148 utilizing an electromagnet or vacuum suction cups. The centering unit 148 preferably positions each of the top moving plates 72 over each of the female die and bottom moving plates 71 within a positional tolerance of than 1.0 mm.

The system according to the invention is also designed for re-use of the female die and bottom moving plates 71. As best illustrated in FIG. 6, the female die and bottom moving plates 71 are transferred lengthwise from the holding station 135 to a female die and bottom moving plate cooling room 140 by transfer tables 85 where they are cooled down to 125° C. The air in the female die and bottom moving plate cooling room 140 has a flow of 40,000 m$^3$/hr, an inlet temperature of 25° C. and an outlet temperature of 45° C., for a total dissipated energy of 284 kW/hr. The outlet air from the female die and bottom moving plate cooling room 140 may optionally be vented to an apparatus for recovery of dissipated heat energy from the cooling female die and bottom moving plates 71 by passing the outlet air through a heat pump. Alternatively, the heat pump may be incorporated into the female die and bottom moving plate cooling room 140. After cooling, the female and bottom moving plates 71 are transferred by transfer tables 85 to a gantry frame 150 where an operator may use the gantry frame 150 to lift up the female die and bottom moving plates 71 and clean them. If any of the cleaned female die and bottom moving plates 71 needs to be removed from the line, an operator may remove them using another gantry frame 151. Otherwise, the cleaned female die and bottom moving plates 71 are transferred by transfer tables 85 to the loading assembly 80 for deposition of a new batch of RBEV mixture.

Low density and high density hardened slabs of RBEV composite are advantageously stacked for more efficient handling and processing. As best shown in FIG. 4, pallet spacers 136 and 137 transfer pallets to stacking stations 131 and 132 for stacking of low density hardened slabs. Pallet spacer 138 transfers pallets to stacking station 133 for stacking of high density hardened slabs. At each stacking station 131, 132, 133, up to twelve hardened slabs are stacked with five 50 mm by 19 mm spacer kiln sticks placed in between each pair of adjacently stacked slabs in order to provide air gaps between the slabs and to provide easier handling of the slabs.

The high density, stacked, hardened slabs are transferred from stacking station 133 to position 158 for manual transfer by operators for cutting and forming into sizes suitable for structural members such as rails and stiles. The low density, stacked, hardened slabs are transferred from stacking stations 131, 132 to positions 156, 157 for manual transfer by operators for further processing.

The low density hardened slabs may optionally be trimmed after stacking in order to allow the slabs to be more uniformly processed. If so, the low density hardened slabs should be trimmed to a final length desired for the slab.

Figure 7:
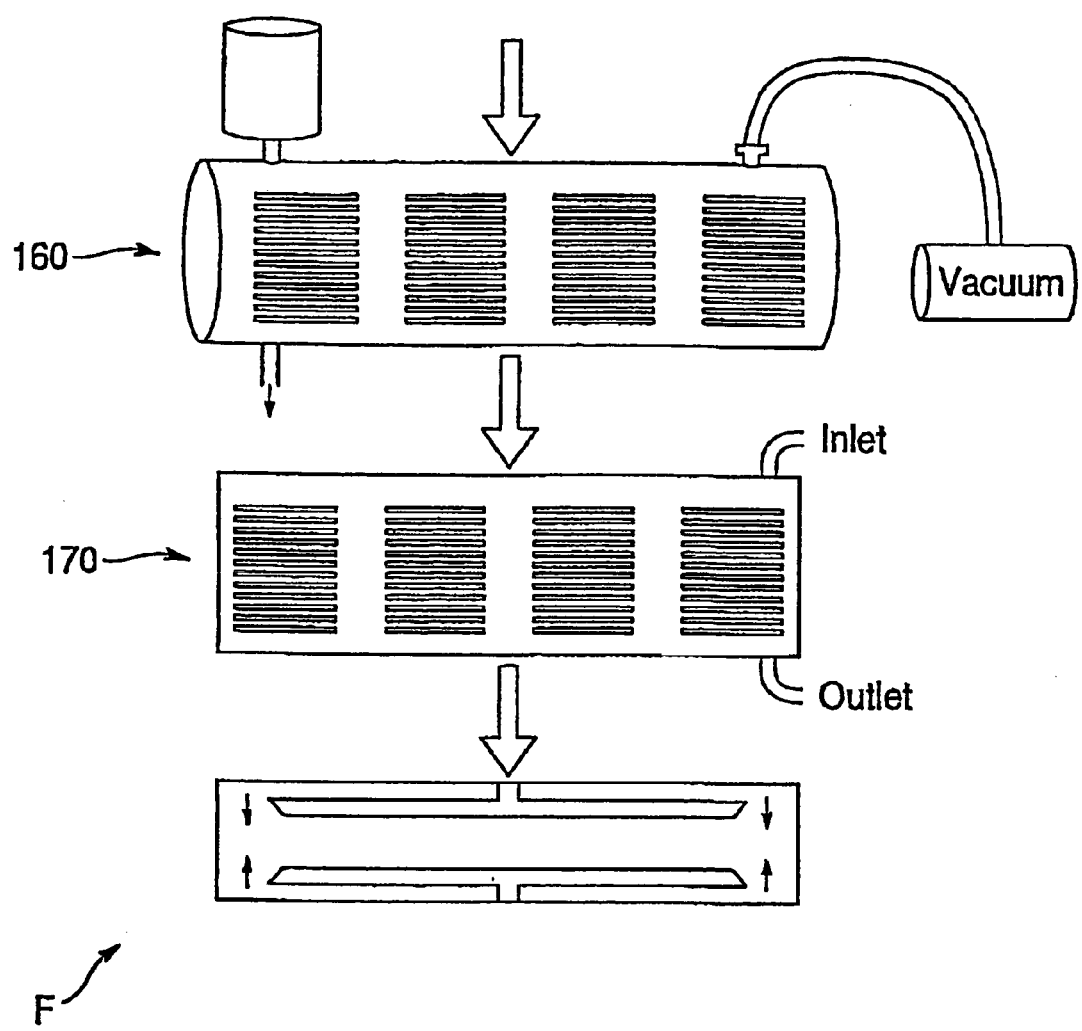
FIG. 7 is a schematic drawing of a water impregnating, drying and trimming station in the inventive system.

The stacked, low density hardened slabs are then moved from positions 156, 157 to a water impregnation assembly 160, as best illustrated in FIG. 7, where the stacked slabs and spacers are impregnated with water. Suitable results are achieved when water impregnation is accomplished in any one of three ways.

Preferably, the low density hardened slabs are impregnated by water at an elevated pressure. This is accomplished by placing the slabs in the water impregnation assembly 160. If this method of water impregnation is chosen, the assembly 160 is advantageously an elongated, cylindrical, sealable, pressurized container. A low vacuum is drawn on the assembly 160. After substantially all the air in the assembly 160 is exhausted, the assembly 160 is allowed to be filled with water. Once full, a positive pressure of about 3–5 bar is applied to the filled assembly 160 and the slabs allowed to be impregnated for about 5–10 minutes.

The low density hardened slabs may also be impregnated by immersion in a bath of water having a surfactant for a total immersion time of about 2–12 hours. The surfactant lowers the surface tension of the water and allows it to more easily impregnate the slabs. Preferably, the surfactant is butyl cellusolve and is present at a concentration of about 0.5% by weight of the water.

The low density hardened slabs may also be impregnated by absorption with steam. If so, the water impregnation assembly 160 is a steam-injected kiln. In this application, the total absorption time is about 12–30 hours.

Regardless of how water impregnation is accomplished, the water impregnation assembly 160 preferably has a size suitable to accommodate four sets of stacks, each consisting of twelve low density hardened slabs separated by spacer kiln sticks. One skilled in the art will appreciate that the assembly 160 may be adapted to contain more or less than 48 slabs.

The hydraulic binder added to the RBEV mixture will be less than fully hydrated with chemically bound water. Also, some of the chemically bound water might possibly be released as steam during the heated pressing step. In order to fully activate the cooling property of the water chemically bound by the hydraulic binder, the hydraulic binder should ideally become fully hydrated during water impregnation.

As shown in FIG. 7, after water impregnation, the low density hardened slabs are transferred to a drying assembly 170, where the slabs are dried to a predetermined moisture content by circulating heated moist air in between the slabs. The drying assembly 170 holds up to 48 packs, each pack consisting of twelve low density hardened slabs separated by spacer kiln sticks, but the assembly 170 may be adapted to contain more or less than 48 packs. The assembly 170 advantageously employs moist air having a humidity of about 30–40%, at an air speed of about 3–6 m/sec, and at a temperature below 70° C., preferably 50–65° C. Excess thermal energy from the warm, moist air exiting the inside of the assembly 170 may be recovered by passing the exiting air through a dehumidifying heat pump. Preferably, the water-impregnated slabs are dried for about 24–36 hours to achieve a final moisture content of about 10–14% by wt. More particularly, the crystalline water of hydration content should be about 6.6% by weight of the slab.

The dried low density, hardened slabs are then transferred to a trimming assembly 180 where each slab is trimmed to a final length desired for a fire door core. Because 70% of all fire doors have the same size, when a fire door smaller or larger than this common size is needed, correspondingly smaller or larger cores are needed. In order to lower equipment and production costs, the same mold 70 for the low density hardened slabs may be used to make a variety of fire door cores with different sizes. Hence, the mold 70 preferably has a size corresponding to the cores found in 70% of all fire doors made. With this in mind, the low density hardened slabs having this common size may be cut down to provide a core for a fire door smaller than the most common size. Otherwise, portions may be trimmed from low density hardened slabs and attached to a whole low density hardened slab, in order to provide a core for a fire door larger than the most common size.

Vermiculites are well known materials chosen from any of a group of micaceous silicate minerals, and normally exist in laminar form. Exfoliated vermiculite is produced by applying heat to vermiculite, wherein the encapsulated water contained in the vermiculite is released as steam and explosively expands between individual lamina or stacks of laminae, so that the exfoliated vermiculite yielded has a size of about 15 to 25 times greater than vermiculite before exfoliation.

The exfoliated vermiculite particle size is preferably either Grade 4 or Grade 5, with Grade 5 preferred. Grades 4 and 5 exfoliated vermiculite have nominal particle sizes of about 1.0 mm and 0.5 mm, respectively, and contain distributions of different particle sizes. Suitable exfoliated vermiculite may be obtained from W.R. Grace & Co. (under the name Zonolite #5), Virginia Vermiculite, or Palabora Mining.

It has been found that up to 10% by weight of the vermiculite may be recycled RBEV. The recycled RBEV may be in the form of dust created when the slabs are sawed to size or may be crushed, such as in a hammer mill, in order to recycle broken slabs, rejected pieces, etc.

The resin is preferably a novolac resin, which is a resin based on phenol and formaldehyde, wherein the molar ratio of phenol to formaldehyde exceeds one. Preferably, the novolac resin has a reaction temperature starting at about 130° C. As discussed above, a resin catalyst may be used in conjunction with the novolac resin. This catalyst upon decomposition with heat from the pressing will give rise to a source of ammonia, and thus curing of the resin. After curing, the resin becomes a hard, strong and insoluble three-dimensional stable network that bind the hydraulic binder, vermiculite and fibrous reinforcement. If novolac resin is selected, it may be used in finely divided powder form. It is also desirable to employ a novolac resin that flows at a temperature less than the decomposition/activation temperature of the catalyst, and a catalyst whose decomposition/activation temperature substantially overlaps the reaction temperature of the novolac resin. Preferably, the novolac resin begins to flow at 130° C. Examples of suitable novolac resins include 6240 or 3174 or SSA 602N obtainable from Schenectady Corp. (South Africa), Plyophen 24–700, Plyophen 602N or Varcum 3337 obtainable from PRP Resins Division of Sentrachem Ltd. (South Africa). Other suitable resins may be obtained from Rutgers-Plenca, LLC, Occidental Chemical Corporation, or Borden Chemicals.

As also discussed above, an internal release agent is also desirable in the RBEV mixture in order to assist removing a hardened slab of RBEV composite from a mold. It may be added in an amount corresponding from about 1% by wt. of the RBEV mixture to about 1% by wt. of the resin. Preferably, it is added in an amount corresponding to 0.5–1.0% by wt. of the resin. Suitable internal release agents include various products known under the general name MoldWiz (available from Axel Plastics Research Laboratories, Inc.) with the following product numbers: INT-1E-117, INT-2E/AP, INT- 2E-DS, INT-AM150, INT-4E-11S, INT-4E-11CC, INT-4E-18CC, INT-12, INT-1312MS, INT-1425PNP and INT-1830PN.

Suitable surface release agents include a resin solution in aliphatic hydrocarbon known as Xtend 19 SAM, and a resinous emulsion known as MoldWiz EM-1212SF2 (both available from Axel Plastics Research Laboratories, Inc.).

In order to provide the greatest assistance in removing hardened slabs of RBEV composite from the molds 70, hard chrome plating or hard polished steel surfaces may be provided on the compression mold 70, in addition to the use of a surface release agent and internal release agent.

The hydraulic binder may be chosen from one or more of gypsum, hydrated gypsum, Portland cement, high alumina cement, gypsum cement, $\alpha$-calcium sulfate hemihydrate, $\beta$-calcium sulfate hemihydrate, magnesium oxychloride, magnesium oxysulphate, calcium sulphoaluminate cement, an alkali silicate, and ground granulated blast furnace slag. Preferably, the hydraulic binder is synthetic gypsum, more preferably calcium sulfate $\alpha$- or $\beta$-hemihydrate. Calcium sulfate $\beta$-hemihydrate is most preferred. Suitable gypsum may be obtained from BPB Gypsum under the name Standard Rhinoplaster.

As mentioned above, fibrous reinforcement may also be included in the RBEV composite in order to increase the tensile strength, rigidity and structural integrity of support structures formed from a high density hardened slab. As the RBEV mixture is mixed, the resin starts to bond to the surface of fibers contained in the fibrous reinforcement. When the RBEV is cured, the resin and fibrous reinforcement forms a strong, rigid network of resin-bonded fibers, thereby further enhancing the RBEV composite's ability to be used as a freestanding structure. The fibrous reinforcement may be chosen from one or more of glass fibers, chopped strand glass fibers, inorganic fibers, and Dralon fibers. Suitable glass fibers include 12.5 mm chopped strand glass fiber available from Owens Corning. The fiber length may be from 4 mm to 12.5 mm. The fibers should be dispersed within the RBEV mixture in order to enhance the development of the "grain" and the high density hardened slab's corresponding ability to firmly hold threaded fasteners inserted into it.

In preparing the RBEV mixture prior to depositing it into the molds 70, it is desirable that the hydraulic binder, resin, fibrous reinforcement, and exfoliated vermiculite may be provided in amounts that will result in a hardened slab containing about 1–50% by wt. hydraulic binder, about 5–20% by wt. resin, about 0–20% by wt. fibrous reinforcement, and about 50–85% by wt. exfoliated vermiculite. Preferably, the RBEV mixture ingredients are added in amounts corresponding to a hardened slab containing about 20–40% by wt. hydraulic binder, about 5–15% by wt. resin, with the balance being substantially all vermiculite. Narrower weight percentages for each of the RBEV mixture ingredients may be selected for the particular density desired for the hardened slab. For example, for a lower density hardened slab (about 350–600 kg/m$^3$), the RBEV mixture ingredients may be added in amounts corresponding to a hardened slab containing about 10–50% by wt. hydraulic binder, 8–20% by wt. resin, 0–5% by wt. fibrous reinforcement, and 50–70% (preferably about 57%) by wt. exfoliated vermiculite. For a higher density hardened slab (about 900–1300 kg/m$^3$), the RBEV mixture ingredients may be added in amounts corresponding to a hardened slab containing about 1–5% by wt. hydraulic binder, 5–10% by wt. resin, 5–20% by wt. fibrous reinforcement, and 55–85% (preferably 80%) by wt. exfoliated vermiculite.

Sixteen groups of RBEV mixtures (three batches each) were prepared according to the following process. It is noted that the hardened slabs of RBEV composite were prepared under less than ideal conditions according to a pre-production process. One skilled in the art will appreciate that the temperatures, pressing pressures and times mentioned hereafter may be varied. First, a submixture of 28 parts by wt. gypsum (BPB Gypsum, Standard Rhinoplaster), 12 parts by wt. novolac resin (Schenectady, SSA 602N), and 3 parts by wt. glass fibers (Owens Corning, 12.5 mm chopped strand) was mixed with a paddle in a mixing assembly for 2 minutes. Next, a mixture of 57 parts by wt. exfoliated vermiculite Before hydration, the size, mass, and density of each slab were measured. After hydration, the mass, density, as well as percent of water uptake of each slab were measured. The water uptake is the percent obtained by dividing the difference in weight between the post-hydrated slab and pre-hydrated slab by the weight of the pre-hydrated slab. After drying, the size, mass, density, as well as percent moisture of each slab were measured. The results are reported in Table I.

TABLE I

| Panel ID | Before Hydration | | | After Hydration | | | After Drying | | | |
|---|---|---|---|---|---|---|---|---|---|---|
| | size (cm) | mass (kg) | density (kg/m$^3$) | mass (kg) | density (kg/m$^3$) | % water uptake | size (cm) | mass (kg) | % moisture | density (kg/m$^3$) |
| PD016 | 260 × 125 × 4.1 | 66.5 | 499 | 138.1 | 1036 | 108 | * | * | * | * |
| PD017 | 260 × 125 × 4.1 | 67.4 | 506 | 137.7 | 1033 | 104 | 260 × 125 × 4.1 | 65.6 | 5.19 | 533 |
| PD018 | 260 × 125 × 4.1 | 66.1 | 496 | 137.4 | 1031 | 108 | ** | ** | ** | ** |
| PD019 | 260 × 125 × 4.1 | 64.3 | 483 | 135.4 | 1016 | 111 | 260 × 125 × 4.1 | 63.2 | 6.22 | 514 |
| PD020 | 260 × 125 × 4.11 | 65.6 | 492 | 135.2 | 1012 | 106 | 250 × 120 × 4.11 | 64.3 | 6.55 | 521 |
| PD021 | 260 × 125 × 4.1 | 66.6 | 500 | 139.4 | 1046 | 109 | 260 × 125 × 4.1 | 65.4 | 6.01 | 532 |
| PD022 | 260 × 125 × 4.1 | 65.6 | 492 | 139.5 | 1047 | 113 | 260 × 125 × 4.1 | 64.1 | 5.64 | 521 |
| PD023 | 260 × 125 × 4.1 | 65.3 | 490 | 134.4 | 1009 | 106 | 260 × 125 × 4.1 | 63.8 | 5.67 | 519 |
| PD024 | 260 × 125 × 4.1 | 65.5 | 492 | 133.3 | 1000 | 104 | 260 × 125 × 4.1 | 63.9 | 5.04 | 520 |
| PD025 | 260 × 125 × 4.1 | 65.8 | 494 | 138.9 | 1042 | 111 | 260 × 125 × 4.1 | 64.2 | 5.62 | 522 |
| PD026 | 260 × 125 × 4.09 | 65.1 | 490 | 137.7 | 1036 | 112 | ** | ** | ** | ** |
| PD027 | 260 × 125 × 4.1 | 65.5 | 492 | 137.7 | 1033 | 110 | 260 × 125 × 4.1 | 63.9 | 5.80 | 520 |
| PD028 | 260 × 125 × 4.1 | 67.8 | 509 | 134 | 1006 | 98 | 260 × 125 × 4.1 | 66.5 | 6.49 | 541 |
| PD029 | 260 × 125 × 4.1 | 65.8 | 494 | 132.2 | 992 | 101 | 260 × 125 × 4.1 | 64.5 | 5.62 | 524 |
| PD031 | 260 × 125 × 4.1 | 66.3 | 498 | 135.3 | 1015 | 104 | 260 × 125 × 4.1 | 66.0 | 8.45 | 537 |

*—used as sample
**—cracked (W.R. Grace & Co., Zonolite #5) and 43 parts by wt. of the submixture (as prepared above) were mixed in another mixing assembly with a paddle for 4 minutes.

Each batch of the mixture prepared above was loaded into separate compression molds. Each filled compression mold consisted of two carrier plates coated with a surface release agent sandwiching a frame enclosing the RBEV composite mixture. The filled compression molds were pressed in a heated press maintained at a temperature of about 145–155° C. The pressure of the press was increased to a closing pressure of about 13.0–16.2 MPa for a total pressing time of about 29–35 minutes.

Each of the hardened slabs of RBEV composite were then removed from the compression molds and trimmed to a length of about 2,460–2,650 mm, and to a width of about 1,200–1,260 mm. The slabs were then stacked eight to a stack and immersed in water for 2–2½ hours at a pressure of about 150 kPa. The slabs of RBEV composite were then dried in a wood kiln for about 137 hours at a temperature of about 36–44° C. Finally, the slabs were trimmed to a final length of 2,500 mm and a final width of about 1,200–1,220 mm.

We claim:

1. A fire retardant fire door core forming system, comprising:

a) a plurality of raw material sources for storing raw materials including exfoliated vermiculite, resin and hydraulic binder;

b) a mixing system, said mixing system in communication with said raw material sources, said mixing system comprising a first mixing assembly for combining said resin and said hydraulic binder to create a submixture and a second mixing assembly in communication with said first mixing assembly for combining said submixture with said exfoliated vermiculite to create a final mixture;

c) a plurality of molds, each mold in operative communication with said second mixing assembly for receiving a predetermined supply of said final mixture of said raw materials from said second mixing assembly thereby providing a plurality of filled molds;

d) vibratory assembly for receiving each of said filled molds and for causing said final mixture of said raw materials in said filled molds to achieve a substantially uniform density in each of the associated filled molds;

e) a heated press in operative association with said vibratory assembly for receiving the filled molds and for applying sufficient heat and pressure for a sufficient period to cause said final mixture of said raw materials in each of said filled molds to form fire retardant fire door cores having a hardened state; and f) a multi-mold unloading assembly in operative association with said heated press, said unloading assembly having unloading extractors for removing the hardened cores from said press and placing the hardened cores on an unloading device.

2. The system of claim 1, wherein said first mixing assembly is selected from the group consisting of a paddle mixer, a ribbon blender, and an air blender.

3. The system of claim 1, wherein said heated press includes channels filled with circulating oil and a controller for controlling the temperature of the circulating oil.

4. The system of claim 1, wherein each of said plurality of molds includes a female die and bottom moving plate and a top moving plate that cooperate to form a cavity.

5. The system of claim 4, wherein inwardly facing surfaces of said bottom and top moving plates include one of a chrome plating and polished steel surface.

6. The system of claim 1, further comprising:

a) a water impregnation assembly operatively associated with said unloading assembly for impregnating the hardened cores with water or steam; and b) a drying assembly operatively associated with said water impregnation assembly for drying the cores to a predetermined moisture content.

7. The system of claim 6, wherein said water impregnation assembly includes a pressurized container filled with water and a surfactant that impregnates the hardened cores.

8. The system of claim 6, further comprising a trimming assembly operatively associated with said drying assembly for trimming the dried hardened cores to a desired size.

9. The system of claim 1, wherein said unloading device includes separate compartments for holding one of the hardened cores.

10. The system of claim 9, further comprising an adjustable unloading station, said adjustable unloading station having an extractor for removing the hardened cores from said compartments and a lift mechanism for vertically moving the extracted hardened cores to a height of an associated transfer table.

11. The system of claim 10, wherein said transfer table includes a lift mechanism for vertically moving said transfer table and rollers for laterally moving said transfer table.

12. The system of claim 10, further comprising a stacking assembly having pallet spacers for transporting the hardened cores from said transfer table to a stacking station for receiving stacks of the hardened cores.

* * * * *